Oct. 22, 1957     J. J. BRANDT     2,810,777

BATTERY CAP

Filed May 11, 1953

INVENTOR
Jens J. Brandt

BY Robert M. Dunning

ATTORNEY

United States Patent Office 2,810,777
Patented Oct. 22, 1957

2,810,777

BATTERY CAP

Jens J. Brandt, St. Paul, Minn., assignor to Minnesota Plastics, Wacouta, Minn., a corporation of Minnesota Application May 11, 1953, Serial No. 354,037

8 Claims. (Cl. 136—177)

This invention relates to an improvement in battery caps and deals particularly with a cap closure for the top of a wet seal battery.

Batteries of the type used in automobiles and the like are usually provided with a screw cap at the top of each cell which may be removed for replenishing the water in the cell. In view of the fact that gas is formed during the operation of the battery, these caps are usually provided with vent openings. In recent years many of the caps produced are hollow with spaced top and bottom walls. The openings in the bottom wall are not aligned with the openings in the top wall so that the acid in the battery will not splash through the cap. However, it has been found that a small amount of fluid in the battery cap will sometimes seal the openings and prevent proper venting.

A feature of the present invention resides in the provision of a hollow battery cap having spaced upper and lower walls and having an upwardly extending boss on the lower wall having a passage therethrough. When liquid is splashed into the interior of the cap, it can not readily bridge over the opening through the boss and the sealing of the vent holes is prevented.

A further feature of the present invention resides in the provision of a hollow battery cap having upper and lower walls in spaced relation and having vent openings in both of these walls. The lower wall is also provided with an upwardly extending tubular projection extending into spaced relation with the under surface of the top wall. In the event the openings through the bottom wall become sealed by battery liquid, the passage through the tubular projection remains open so that proper venting of gasses may take place. Any liquid which is splashed through the tubular passage will drain into the lower portion of the cap and through drain openings in the portion of the bottom wall surrounding the upward projection.

These and other objects and novel features of the invention will be more clearly and fully set forth in the following specification and claims.

In the drawings forming a part of the specification, Figure 1 is a top perspective view of a battery cap showing the construction thereof.

Figure 4:
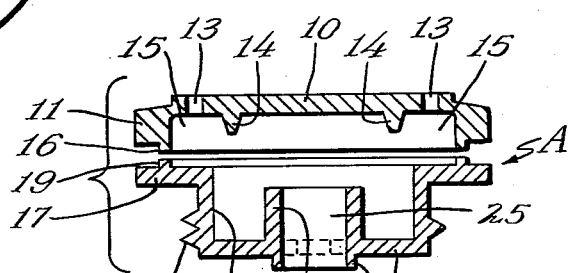
Figure 4 is a sectional view through the two portions forming the cap, the position of the section being indicated by the line 4—4 of Figure 1.

The battery cap is indicated in general by the letter A. This cap is formed of two main parts shown before attachment in Figure 4 of the drawings. The top portion includes a disc-like body 10 marginally connected to a ring-shaped flange 11. This flange 11 is provided with a series of angularly spaced teeth 12 so that the cap may be easily grasped and rotated. The disc 10 is provided with a pair of oppositely disposed vent openings 13 extending therethrough. These vent openings are near the periphery of the disc 10 and near the juncture between the disc and the flange 11.

A pair of parallel downwardly projecting ribs 14 are provided on the under surface of the disc 10. These ribs 14 extend along chords of the flange 11 and act to form chambers 15 within the cap partially separated from the remaining interior of the cap. These ribs act as baffles in preventing liquid from splashing directly through the cap.

A small downwardly projecting ring-shaped flange 16 is connected to the undersurface of the flange 11 near the inner surface thereof. This flange 16 is pressed against a similar flange in the bottom portion of the cap when the cap is joined as will be later described.

The bottom portion of the cap includes a flat ring-shaped portion 17 which is provided with an upwardly projecting circular flange 19 thereupon. The flange 19 is in opposed relation to the flange 16 and merges therewith when the two parts of the cap are sealed together.

The ring-shaped portion 17 is provided with a downwardly projecting cylindrical flange 20 thereupon which is externally threaded as indicated at 21. The upper end of the cylindrical flange 20 is connected to the inner margin of the ring-shaped portion 17 and the lower end of this flange 20 is closed by a bottom closure 22. The bottom closure 22 is substantially below the disk 10 of the upper portion in assembled form of the cap so as to provide a hollow interior.

Figure 5:
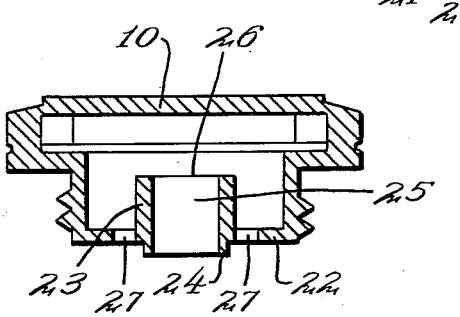
Figure 5 is a sectional view through the cap, the position of the section being indicated by the line 5—5 of Figure 2.

A cylindrical projection 23 extends upwardly from the bottom closure 22 at the center thereof. A short downwardly projecting cylindrical extension 24 extends below the under surface of the bottom closure 22. The upwardly and downwardly extending projections 23 and 24 are tubular and have an axial passage 25 extending therethrough. As shown in Figure 5 of the drawings, the upper end 26 of the projection 23 is substantially below the disc-shaped top portion 10.

Figure 1:
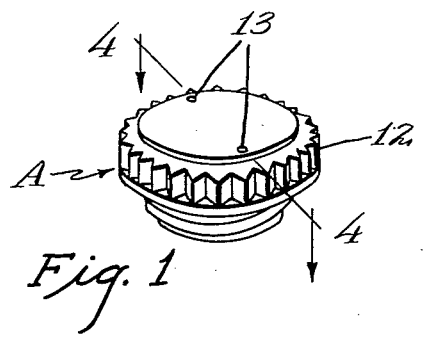
Figure 2:
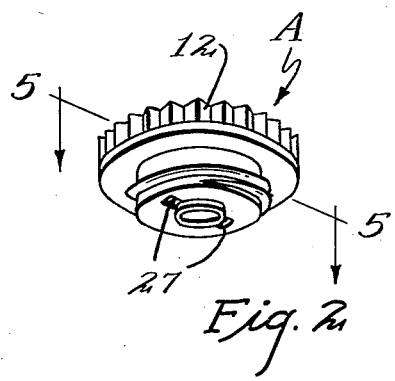
Figure 2 is a bottom perspective view of the battery cap shown in Figure 1.
Figure 3:
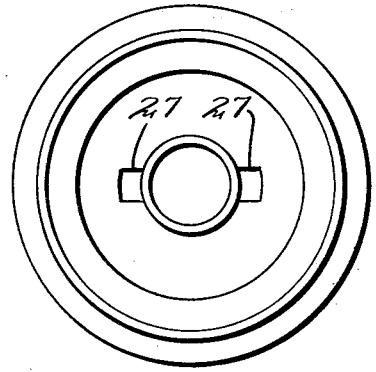
Figure 3 is a top view of the bottom portion of the cap.

As indicated in Figures 2, 3 and 5 of the drawings, a pair of opposite apertures 27 extend through the bottom closure 22 on opposite sides of the projections 23, 24. These openings 27 serve as vent openings or may serve as drain openings for liquid within the cap.

In the past it has been common practice to produce battery plugs of the same general hollow form illustrated, eliminating the projections 23, 24 and depending upon spaced apertures such as 27 to vent the battery cell. We have found that when battery liquid is splashed into the cap, the liquid tends to seal the apertures rather than to drain therethrough forming a lock which tends to prevent the proper venting of the gas.

In the present construction, the gas may pass through the passage 25 as well as through the openings 27 to enter the cap and may leave the cap through the vent openings 13. In the event liquid is splashed through certain of these openings in the cap tending to seal the vent openings, the liquid can not readily bridge the projection 23 because of its size. Therefore, any such liquid tends to drain into the bottom of the cap and through the drain openings 27 into the interior of the battery. As the gas can freely enter the interior of the plug, the tendency for the liquid to seal the openings seems to be substantially reduced. Furthermore, the proximity of the openings 27 to the downwardly projecting flange 24 seems to provide a capillary effect which assists drainage.

In accordance with the patent statutes I have described the principles of construction and operation of my battery cap and while I have endeavored to set forth the best embodiment thereof, I desire to have it understood that obvious changes may be made within the scope of the following claims without departing from the spirit of my invention.

I claim:
1. A battery cap including a hollow body having spaced upper and lower walls, the upper wall having at least one aperture therethrough, the lower wall also having an aperture therethrough out of alignment with the aperture in the upper wall, a tubular projection extending upwardly from the upper surface of the bottom wall toward the upper wall, said tubular projection terminating in spaced relation to the upper body wall and having a passage therethrough communicating with the interior of the body, whereby liquid splashing upwardly through said tubular projection may drain through said lower wall aperture.

2. The construction described in claim 1 and including a downwardly extending open ended tubular projection on the bottom surface of the lower wall in alignment with the upwardly extending tubular projection.

3. A battery cap including a hollow body having an upper portion of relatively large diameter and a lower portion of relatively small diameter, threads encircling the small diameter portion, the body having spaced upper and lower walls, the upper wall having openings therethrough, the lower wall having openings therethrough out of alignment with the first named openings, the lower wall having a tubular projection extending upwardly from the lower wall into spaced relation with the upper wall, said tubular projection forming an open passage through which liquid may splash, whereby liquid splashing into said hollow body may drain therefrom through said lower wall openings.

4. The construction described in claim 3 and including a downwardly extending tubular projection on the lower wall aligned with the upwardly extending projection.

5. The construction described in claim 3 and in which the openings in the upper wall are near the outer periphery of the upper wall and the under surface thereof is provided with spaced rib means to serve as baffles forming relative partial chambers for said openings.

6. A battery cap including a hollow body having an upper portion of relatively large diameter and a lower portion of relatively small diameter, threads encircling the small diameter portion, the body having an upper wall provided with openings therethrough near the outer periphery, a lower wall in parallel relationship to said upper wall having openings therethrough out of alignment with the first named openings, and an open ended tubular projection extending upwardly from the lower wall into spaced relation with the upper wall, the openings in the lower wall being adjacent to the upwardly extending tubular projection, whereby battery liquid splashing through said tubular projection may drain through said lower wall openings.

7. A battery cap including a hollow body having an upper portion of relatively large diameter and a lower portion of relatively small diameter, threads encircling the small diameter portion, the body having spaced upper and lower walls in parallel integral relationship, the upper wall having openings therethrough, the lower wall having openings therethrough out of alignment with the first named openings, the lower wall having an open ended tubular projection forming an axial passage extending upwardly from the lower wall into open spaced relation with the upper wall, and baffles extending downwardly from the upper wall between the openings through the upper wall and the openings through the lower wall, whereby battery liquid splashing through said tubular projection may drain through said lower wall openings.

8. A battery cap including a hollow body having an upper portion of relatively large diameter and a lower portion of relatively small diameter, threads encircling the small diameter portion, the body having an upper wall provided with openings therethrough near the outer periphery, a lower wall having openings therethrough out of alignment with the first named openings, and an open ended tubular projection extending upwardly through said lower wall into open ended spaced relation with the upper wall, the openings of the lower wall being adjacent to the upwardly extending tubular projection, and baffles extending downwardly from the upper wall inwardly of said upper wall openings, whereby battery liquid splashing through said tubular projection may drain through said lower wall openings.

References Cited in the file of this patent
UNITED STATES PATENTS

| | | |
|---|---|---|
| 1,284,746 | Morrison | Nov. 12, 1918 |
| 1,907,911 | Wallace et al. | May 9, 1933 |
| 1,996,292 | Harding et al. | Apr. 2, 1935 |
| 2,631,182 | Hall et al. | Mar. 10, 1953 |

FOREIGN PATENTS

| | | |
|---|---|---|
| 329,188 | Great Britain | May 15, 1930 |